United States Patent [19]

Maack et al.

[11] Patent Number: 5,280,512
[45] Date of Patent: Jan. 18, 1994

[54] ARRANGEMENT FOR PRODUCING X-RAY IMAGES

[75] Inventors: Hanns-Ingo Maack, Norderstedt; Ulrich Neitzel, Hamburg; Ingo Schäfer, Kiel, all of Fed. Rep. of Germany

[73] Assignee: U.S. Philips Corporation, New York, N.Y.

[21] Appl. No.: 893,140

[22] Filed: Jun. 3, 1992

[30] Foreign Application Priority Data

Jun. 3, 1991 [DE] Fed. Rep. of Germany ....... 4118153

[51] Int. Cl.⁵ .......................................... G03G 13/044
[52] U.S. Cl. .................................... 378/29; 378/28
[58] Field of Search .................................... 378/28, 29

[56] References Cited

U.S. PATENT DOCUMENTS 5,093,851  3/1992  Schafer ..................... 378/29

FOREIGN PATENT DOCUMENTS 4015113  11/1991  Fed. Rep. of Germany .

Primary Examiner—Craig E. Church
Attorney, Agent, or Firm—Jack D. Slobod

[57] ABSTRACT

The invention relates to an arrangement for producing X-ray images, which arrangement comprises an X-ray source (1) for the generation of an X-ray beam (10), a layer (41) sensitive to X-rays and situated on a cylindrical drum (4), and a read unit (5) for converting the X-ray image detected in the layer into electrical image values. In order to improve the X-ray images which can be produced by the arrangement an image processor (21) includes a module (212) for transforming the X-ray image (I) situated on the layer into an X-ray image ($I_v$) situated in a virtual plane (12), and a module (211) for improving the uniformity of the modulation transfer function (MTF) over the X-ray image produced.

9 Claims, 4 Drawing Sheets

ARRANGEMENT FOR PRODUCING X-RAY IMAGES

BACKGROUND OF THE INVENTION

The invention relates to an arrangement for producing X-ray images, which arrangement comprises an X-ray source for the generation of an X-ray beam, a layer sensitive to X-rays and situated on a cylindrical drum, and a read unit for converting the X-ray image detected in the layer into electrical image values. This is an arrangement in which all parts of the X-ray image are exposed simultaneously, in contradistinction to the arrangement in accordance with DE-OS 35 34 768, where the parts are exposed successively.

An arrangement of the type defined in the opening sentence is known from EP-OS 94 843 (FIG. 8). Said document does not describe how to eliminate the geometric distortion arising as a result of the curvature of the drum surface.

Moreover, the German Patent Application P 40 15 113.1, which has not been published prior to the date of filing of the present Application, describes an arrangement of the type defined in the opening sentence, which in order to eliminate geometric distortion comprises means for transforming the X-ray image on the layer into an X-ray image in a virtual plane. These means compute the X-ray image projected onto the curved drum into a plane X-ray image.

SUMMARY OF THE INVENTION

It is an object of the present invention to provide a further improvement of the quality of an X-ray image formed in such a manner.

Starting from an arrangement of the type defined in the opening sentence this object is achieved in that there are provided means for transforming the X-ray image situated on the layer into an X-ray image situated in a virtual plane, and there are provided filter means for enhancing the modulation transfer function in the centre of the transformed X-ray image.

Investigations, which have led to the invention, have revealed that the resolution of an X-ray image produced by a such a transformation increases towards the sides which are parallel to the drum axis. This local inhomogeneity of the resolution, which is annoying to the observer, is eliminated by the inventive steps. The filter means enhance the modulation transfer function in the centre of the X-ray image, resulting in an at least substantially uniform resolution in the X-ray image.

For a more uniform resolution the filter means should influence the modulation transfer function in the centre of the X-ray image obtained by the transformation more strongly than towards the sides. The comparative reduction of the resolution could therefore be achieved in that the X-ray image produced by the transformation is subjected to a filter process having a position-dependent transfer function. However, filter means having such a transfer function are rather intricate. In a preferred embodiment the means for influencing the modulation transfer function comprise a filter for edge enhancement, which filter precedes the transformation means. This filter may have position-independent parameters. It has been found that if, as is common practice, the image values are assigned to equidistant image points on the drum surface a position-independent edge enhancement process in the image composed of these image values results in an X-ray image of uniform resolution after the subsequent transformation into a virtual plane. Edge enhancement can then be effected, for example, by means of a so-called unsharp-masking method.

In the unsharp-masking method a low-pass image is produced. This low-pass image is subtracted from the original image and the high-pass image thus formed is added to the original image with a suitable enhancement factor. In the image formed by addition the edges are accentuated more strongly than in the original image. The formation of the low-pass image is a two-dimensional process, i.e. the image values of the image points situated within a square window must be used for the generation of a low-pass image value for an image point.

However, during the edge enhancement, in a preferred embodiment, only those image values are combined with one another which originate from image points situated on the layer in a plane perpendicular to the axis of symmetry of the drum. Thus, in the present case only those image values are used which are assigned to those image points on the drum surface which are interconnected by an arc of circle about the axis. This considerably simplifies the computation of the low-pass image values. Here, use is made of the fact that the resolution varies hardly in a direction parallel to the axis of symmetry of the drum.

BRIEF DESCRIPTION OF THE DRAWING

The invention will now be described in more detail with reference to the drawings. In the drawing

DETAILED DESCRIPTION OF THE PREFERRED EMBODIMENT

Figure 1:
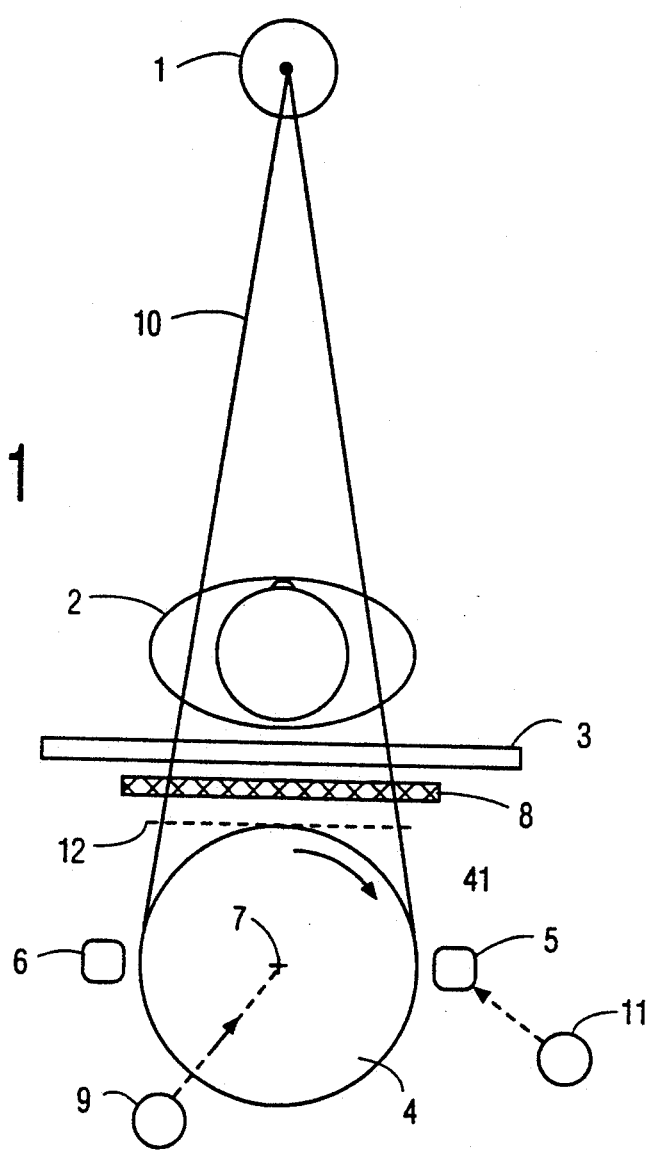
FIG. 1 shows diagrammatically an arrangement in accordance with the invention.

In FIG. 1 an X-ray beam 10 issuing from the focus of an X-ray source 1 traverses a patient 2 lying on a table 3 and a scatter grid 8 before it is incident on a drum 4. The drum 4 is formed by a cylindrical body of circular cross-section, whose cylinder axis 7, which extends perpendicularly to the plane of drawing of FIG. 1, also constitutes its axis of rotation. The drum 4 can be rotated about the axis of rotation 7 by means of a motor drive 9. The circumferential surface of the drum 4 carries a photoconductive layer, preferably a selenium layer 41 of 0.5 mm thickness.

A charging device 6 is arranged outside the radiation path and charges the rotating drum before an X-ray exposure, so that a voltage of, for example, 1500 V is obtained between the surface of the electrically conductive drum and the outer surface of the selenium layer. A read device 5 is also disposed outside the radiation path and reads the charge density in one or more tracks of the rotating drum by means of one or more sensors after an X-ray exposure. To read out the entire circumferential surface of the drum the read unit is moved parallel to the axis of rotation 7 by means of a further drive unit 11 with an average speed which is low in comparison with the circumferential speed of the drum.

During an X-ray exposure the drive 9 for the drum 4 is switched off, so that all the points on the drum surface which contribute to the formation of the relevant X-ray image are exposed simultaneously by the beam 10. When the X-ray pattern is projected onto the curved drum surface distortions arise, which can be eliminated in that the X-ray image on the drum surface is transformed into an X-ray image in a virtual plane 12. This virtual plane is preferably identical to a plane tangent to the drum surface and extending perpendicularly to the plane containing the axis of rotation 7 and the focus of the X-ray source 1.

Figure 2:
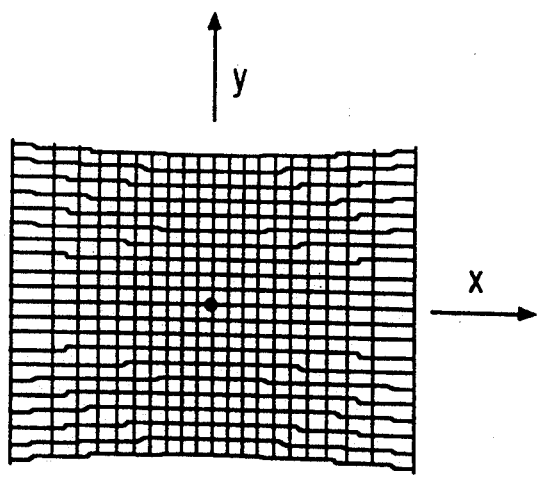
FIG. 2 shows the distortions of a grid on the drum.

FIG. 2 shows the distortion arising when a square-mesh grid disposed in the plane 12 is projected onto the drum. If the direction parallel to the axis of rotation 7 of the drum is the y-direction and the direction perpendicular thereto on the drum (i.e. the circumferential direction) is the x-direction, the following holds for the projection of the grid on the drum surface. The mutual distances between the grid lines in the y-direction increase considerably to either side but these grid lines remain straight. However, the corresponding grid lines in the x-direction do not increase in the centre and increase slightly in the image corners, so that these grid lines exhibit a slight curvature on the drum.

The transformation of the X-ray image of the grid into the virtual plane yields an X-ray image having equidistant grid lines both in the x-direction and the y-direction. How this transformation is effected is described in detail in the prior German Patent Application P 40 15 113.1, herewith incorporated by reference.

However, the X-ray image produced by the transformation exhibits a locally inhomogeneous resolution, as will be explained with reference to FIG. 3, which represents the modulation transfer function MTF in the x-direction as a function of the local frequency, expressed in lp/mm (line pairs per mm), for different areas of the X-ray image. The curve A represents the modulation transfer function in the centre of the image and the curve B represents this function at the edge. The present case is based on a drum diameter of 500 mm, a distance of 1800 mm between the plane 12 and the focus of the source 1, and a distance of 0.2 mm between the image points on the drum. The size of the X-ray image (i.e. the area in the plane 12 traversed by the beam 10) was 430 mm×430 mm, from which it follows that the drum was exposed over a circumferential angle of substantially 140°.

It is clearly visible that the resolution, i.e. the MTF, in the corners is substantially higher than in the centre. This locally varying resolution is unfamiliar to the observer and may lead to misinterpretations. The invention therefore aims at providing an X-ray image whose resolution is uniform all over.

To compensate for a position-dependent resolution the image values generally would have to be subjected to a filter process whose parameters also vary locally. However, such a filter process with position-dependent parameters would be highly intricate. Therefore, a solution will be described which is substantially simpler because it can function with position-independent filter parameters. This solution is based on the recognition of the fact that the non-uniform resolution of the X-ray image produced by the transformation basically has its origin in two effects.

a) The first effect is based on the finite thickness of the selenium layer and on the fact that the X-rays do not impinge perpendicularly but obliquely on this layer at the image edges. In the case of an X-ray beam which enters the photoconductor obliquely the location where the charge on the surface of the layer changes depends on the depth at which the relevant X-ray quantum is absorbed in the photoconductor.

As a result of this effect, the X-ray image, i.e. the charge pattern produced on the drum surface, has a smaller resolution at the edges than in the centre, in contradistinction to the X-ray image produced by the transformation, where the situation is exactly the reverse. This effect depends on the hardness of the X-rays, i.e. on the magnitude of the high voltage applied to the X-ray source 1 for an X-ray exposure. In the case of very low tube voltages this effect is substantially negligible because substantially all the X-radiation is absorbed by the photoconductor surface. However, the effect becomes more pronounced as the tube voltage increases.

b) The second effect is opposite to the first effect. It results from the transformation of the X-ray image in the drum into an X-ray image in the virtual plane 12. As apparent for example from FIG. 2, a detail of specific dimensions situated in the object 2 to be examined (or in the virtual plane 12) will be imaged substantially larger at the edges of the X-ray image than in the centre. As the read unit 5 scans the drum surface at equidistant image points this means that this detail is defined by substantially more image points or image values when it is situated at the edge instead of the centre. Usually, this effect predominates over the first effect and therefore results in the resolution of the X-ray image after the transformation being higher at the edges than in the centre.

To make the resolution more uniform the X-ray image produced on the drum is subjected to an edge enhancement process before it is transformed into the virtual plane. Such an edge enhancement can be achieved, for example, by means of the known unsharp-masking method (cf. DE-PS 29 52 422). This leads to a further enhancement of the edges or the fine image details in the centre, which are distinct anyway as a result of the effect described under a). By a suitable choice of the parameters of this edge-enhancement method it is possible to achieve that after the transformation, in which the edge resolution is enhanced on account of the effect outlined under b), an X-ray image is obtained whose resolution is at least approximately uniform all over. This method and its effect will be described hereinafter.

Figure 4:
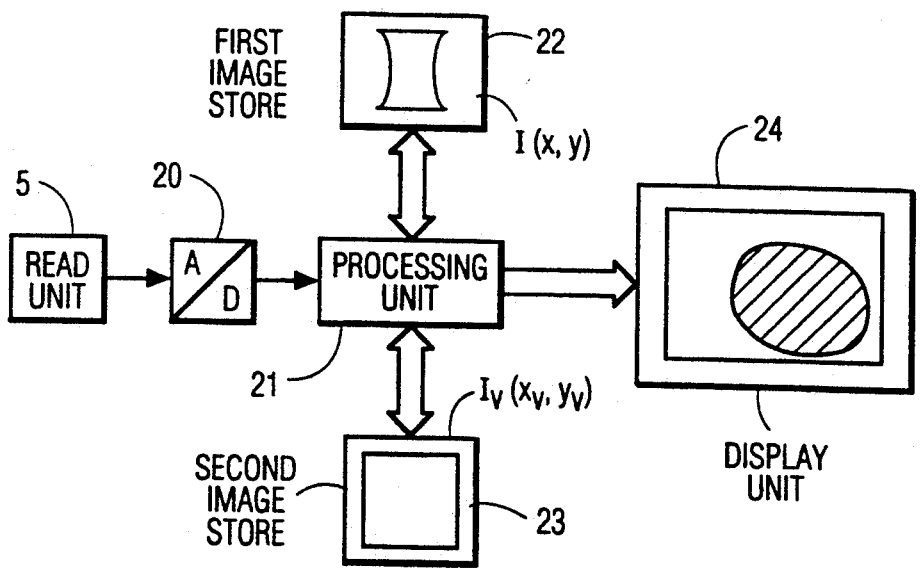
FIG. 4 shows a unit for processing the image values supplied by the read unit.

As is shown in FIG. 4, the read unit 5 supplies signals corresponding to the charge of the drum surface. By means of an analog-to-digital converter 20 these signals are converted into a series of digital data words representing the image values of the X-ray image at equidistant image points.

The image values supplied by the analog-to-digital converter 20 are applied to a processing unit 21 comprising a first image store 22 for the X-ray image $I(x,y)$ on the drum 4 and a second image store 23 for the X-ray image $I_v(x_v,y_v)$ transformed into the virtual plane 12. The processing unit 21, which has an adequate computing capacity, makes the resolution in the X-ray image $I_v$ formed by the transformation independent of the position $(x_v,y_v)$. This X-ray image can be reproduced on a suitable display unit (for example a monitor 24).

Figure 5:
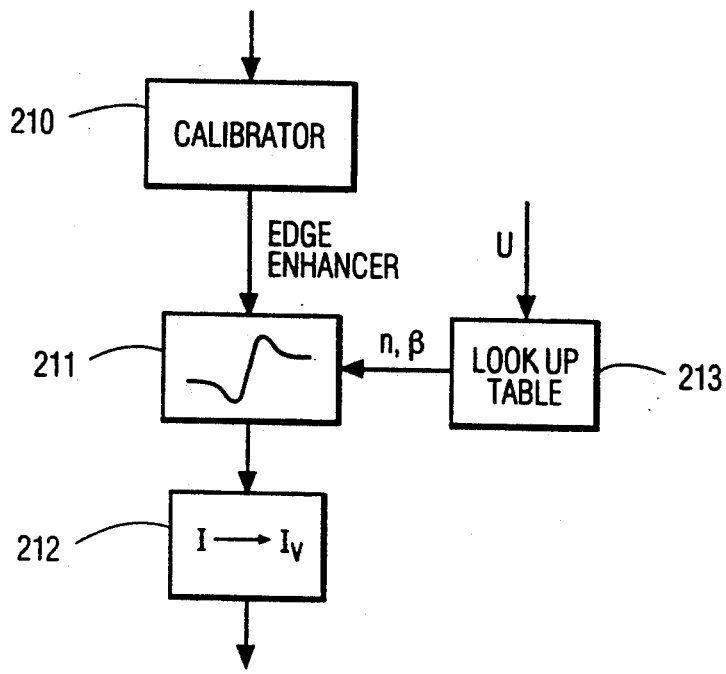
FIG. 5 is a flow chart illustrating the image-value processing.

FIG. 5 is a flow chart illustrating the processing of the image values in the unit 21. The image values supplied by the analog-to-digital converter 20 (FIG. 4) are first calibrated in a first step (block 210). This is in order to eliminate errors introduced by drift and offset effects and by the different sensitivities of the electrometer devices by means of which the read unit 5 scans the charge on the surface of the drum 4.

In a second step the image values of the X-ray image, which have thus been calibrated, are subjected to an edge enhancement process (block 211). The parameters n and $\beta$ required in this filter process are defined by means of a look-up table 213 depending on the high voltage U applied to the X-ray source 1 during the X-ray exposure.

The X-ray image I thus produced is subsequently transformed into an X-ray image $I_v$ in the virtual plane 12 (block 212). For this step reference is made to the prior german Patent Application P 40 15 113.1.

Figure 6:
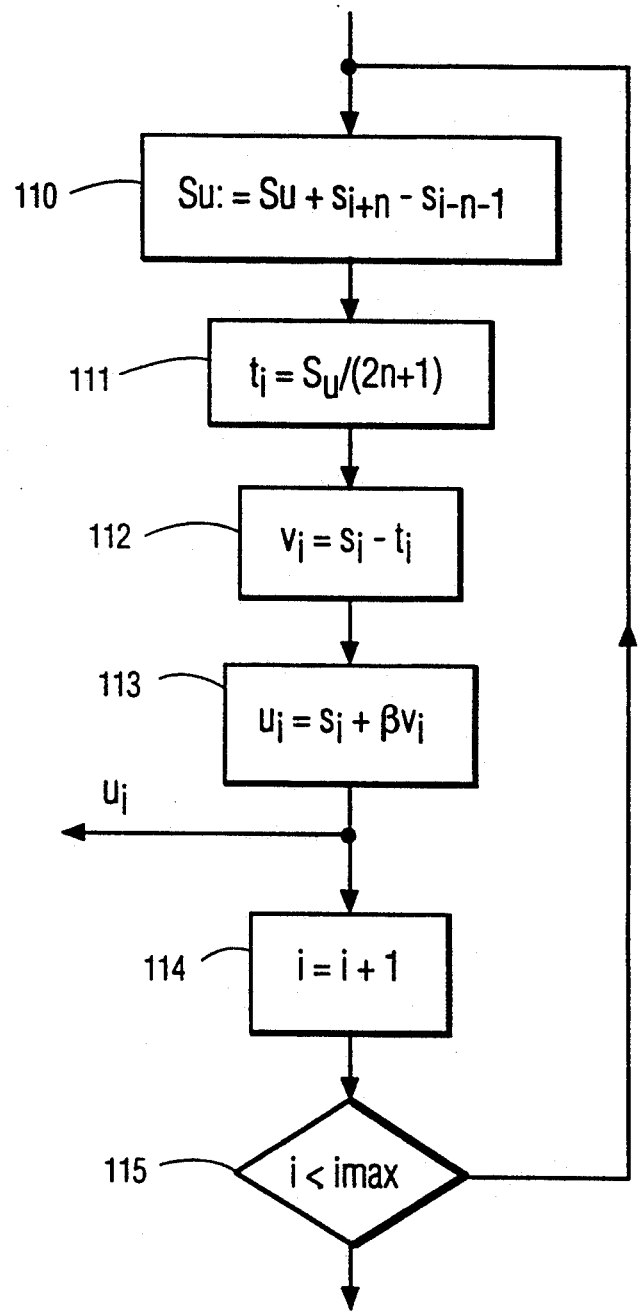
FIG. 6 is a flow chart illustrating the change of the modulation transfer function.

FIG. 6 is a flow chart of the essential part of the edge-enhancement process (block 211). In an edge-enhancement process in accordance with the unsharp-masking method a low-pass image is produced, from which a high-pass image is derived by forming the difference with the original image. The high-pass image is added to the original image. In the image produced by the addition the small details, i.e. the edges, are enhanced in comparison with the original image. The fact that a low-pass image value is derived from the original image values implies that the image values are averaged in a square window around the relevant image point. In principle, this would require a two-dimensional data set. However, below only a two-dimensional data set is used, averaging being effected over 2n+1 image points which succeed one another in the x-direction. For this, use is made of the fact that the effects a) and b) causing the position-dependent resolution essentially depend only on the x-coordinate of an image point (cf. FIG. 2) and hardly on the y-coordinate.

Therefore, it is assumed in a first processing step (block 110) that a value Su is available which corresponds to the sum of the image values of 2n+1 image points around a central image point $x_{i-1}$. In the first processing step the image value $s_{i+1}$ of the image point $x_{i+1}$ is added to this sum value Su and the image value $s_{i-n-1}$ of the image point $x_{i-n-1}$ is subtracted. The resulting new value of Su corresponds to the sum of 2n+1 successive image points around the central image point $x_i$ in the x-direction.

In the next step (111) the sum value thus formed is divided by the factor 2n+1 to form the arithmetic mean $t_i$. This arithmetic mean corresponds to a low-pass image value at the point $x_i$.

In the following step (112) the difference between the image value $s_i$ and the low-pass image value $t_i$ at the image point $x_i$ is formed. The difference value $v_i$ thus formed corresponds to a high-pass image value at the point $x_i$.

In the next step (block 113) the high-pass image value $v_i$ thus formed is multiplied by an enhancement coefficient $\beta$ and the product is added to the original image value $s_i$ for the relevant image point.

Subsequently, the value i is incremented by 1 (block 114) and the program loop (110 . . . 114) just described is traversed again (block 115) until the last image point within a row of successive image points in the x-direction is reached. After this, this process is repeated for another row of image points until all the points of the X-ray image on the drum have been processed.

In the X-ray image derived from the image values $u_i$ thus generated the contrast of small details and of edges is enhanced in comparison with the original image. The size of the details accentuated by means of this process is determined by the filter parameter n and the degree of this accentuation depends on the enhancement coefficient $\beta$. The parameters n and $\beta$ can generally be varied so as to obtain a largely position-independent resolution for any tube voltage but also for different exposure conditions (source to drum distance, size of the image in the virtual plane).

Figure 3:
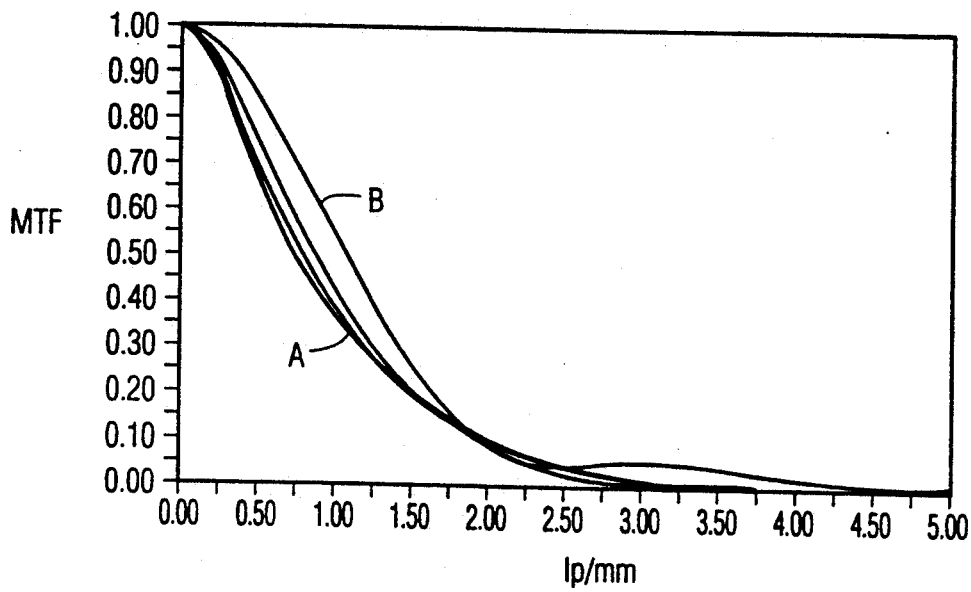
FIG. 3 shows the modulation transfer functions without the inventive steps.
Figure 7:
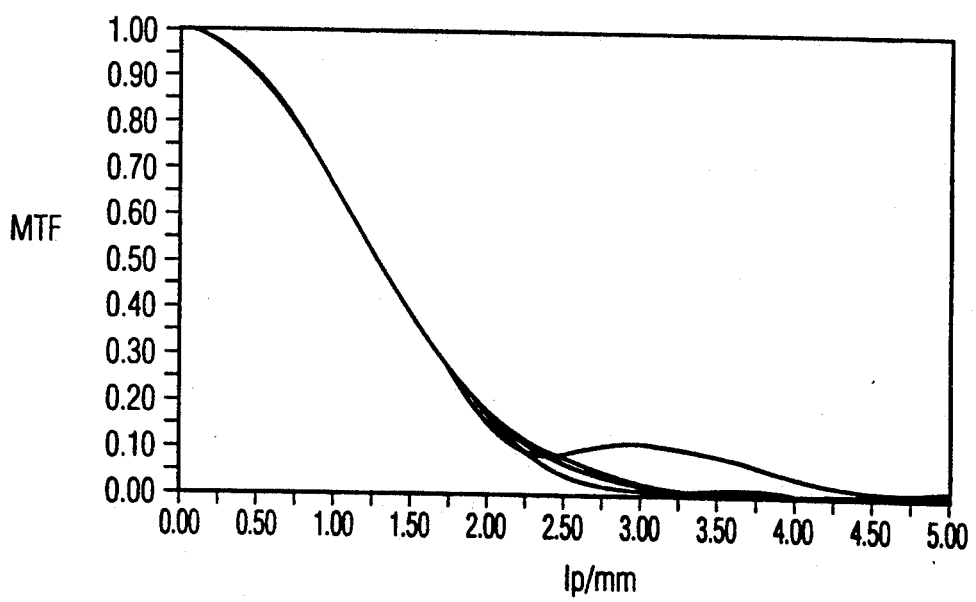
FIG. 7 shows the modulation transfer function after the inventive steps have been applied.

FIG. 7 shows the modulation transfer function MTF as a function of the local frequency in the X-ray image produced after the subsequent transformation (FIG. 5, block 212) for the same areas as FIG. 3. In the local frequency range below the Nyquist frequency (2.5 lp/mm for image points of 0.2 mm), which is essential for the diagnosis, the local resolution is found to be almost wholly uniform. In addition, the MTF in this range is larger than for the curves A and B in FIG. 3. For a tube voltage U of 125 kV this was based on an enhancement factor $\beta=0.8$, the one-dimensional kernel used for low-pass filtering having a magnitude of 5 (i.e. n=2).

With other image parameters an at least approximately homogeneous resolution can be obtained by another choice of the filter parameters n and $\beta$. In specific cases these parameters should be determined empirically and stored in the look-up table 213.

The invention has been described by way of example for a selenium-coated drum. However, the invention can also be used with other photoconductors and also when instead of a photoconductor a layer which is sensitive to X-rays in another way and has a finite thickness is provided, for example a layer of a storage phosphor in which fluorescence radiation is produced which depends on the intensity of the X-rays in the relevant image point. The problem (position-dependent resolution) and the possible solutions are then the same as in the case of a selenium-coated drum owing to the similar physical parameters (finite thickness of the layer which is sensitive to X-rays, drum geometry).

We claim:

1. An arrangement for producing X-ray images, which arrangement comprises an X-ray source for the generation of an X-ray beam (10), a layer (41) sensitive to X-rays and situated on a cylindrical drum (4), and a read unit (5) for converting the X-ray image detected in the layer into electrical image values, characterised in that there are provided means (21, 211) for transforming the X-ray image (I) situated on the layer into an X-ray image ($I_v$) situated in a virtual plane (12), and there are provided filter means (21; 110-115) for enhancing the modulation transfer function (MTF) in the center of the transformed X-ray image to compensate for resolution differences arising in the transformation.

2. An arrangement as claimed in claim 1, characterised in that the layer (41) which is sensitive to X-rays comprises a photoconductor, preferably selenium, and the read unit (5) supplies image values corresponding to the charge pattern on the layer.

3. An arrangement as claimed in any one of the preceding claims, characterised in that the filter means for enhancing the modulation transfer function comprise a filter for edge enhancement (110 . . . 115), which filter precedes the transformation means.

4. An arrangement as claimed in claim 3, characterised in that during the edge enhancement only those image values are combined with one another which originate from image points situated on the layer in a plane perpendicular to the axis of symmetry (7) of the drum.

5. An arrangement as claimed in claim 1, characterised in that there is provided a plurality of sets of filter parameters (n, $\beta$), from which each time one parameter can be selected automatically in dependence upon the high voltage (U) applied to the X-ray source.

6. Apparatus for producing X-ray images, which apparatus comprises:

a cylindrical drum having an X-ray sensitive layer on its cylindrical surface, said layer forming a readable two-dimensional X-ray sensitive pattern in response to X-ray radiation;

an X-ray source for, in response to a high voltage, generating an X-ray beam irradiating said layer, said beam having a central ray perpendicular to the axis of symmetry of the drum which intersects said layer;

a read unit for reading said X-ray sensitive pattern and converting the pattern read into a first array of image values, said first array having image values at points spaced apart along two mutually orthogonal directions in an arcuate surface along said layer, one of which dimensions is parallel to said axis of symmetry; and means for converting said first array of image values to a second array of image values of points spaced apart along two mutually orthogonal directions in a virtual plane normal to said central ray, one of which dimensions is also parallel to said axis of symmetry, said converting means comprising, the following means, one of which feeds the other:

a) means for enhancing relatively high spatial frequency variations between image values of successive points in a direction orthogonal to said axis of symmetry; and b) means for determining image values in accordance with a geometric transformation relating points in said arcuate surface to points in said virtual plane.

7. An apparatus as claimed in claim 6, wherein said enhancing means feeds said determining means.

8. An apparatus as claimed in claim 6, wherein said enhancing means comprises means for enhancing relatively high spatial frequency variations between image values of only successive points in said direction orthogonal to said axis of symmetry.

9. An apparatus as claimed in claim 6, wherein said high voltage is variable in amplitude and wherein said enhancing means enhances said relatively high spatial frequency variations as a function of the amplitude of said high voltage.

* * * * *